(No Model.)
C. E. PHIFER.
ANIMAL POKE.
No. 345,600. Patented July 13, 1886.
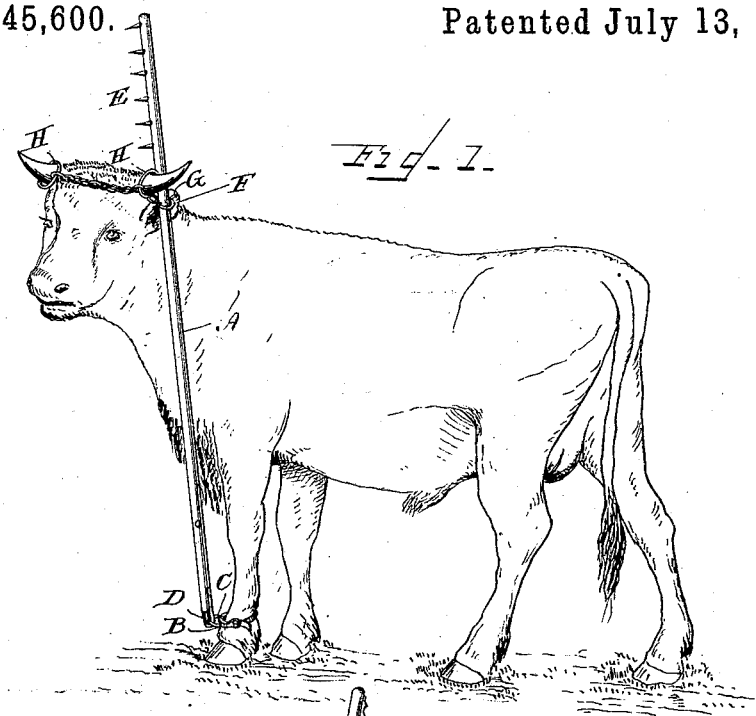
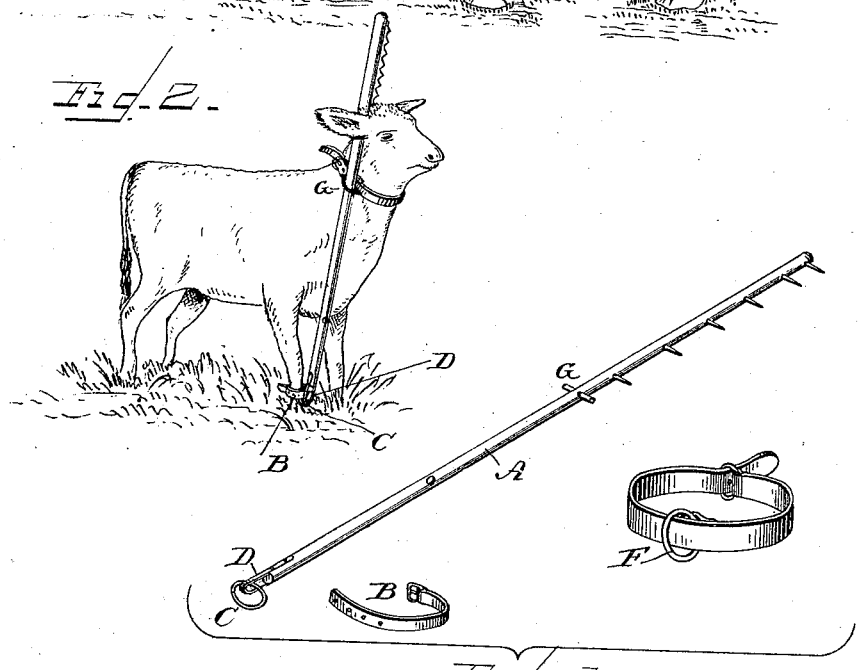
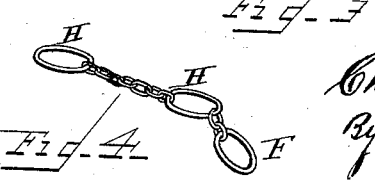
WITNESSES
F. L. Ourand
D. H. Decker
INVENTOR
Charles E. Phifer
By W. S. Boyd.
Attorney

UNITED STATES PATENT OFFICE.

CHARLES E. PHIFER, OF JESUP, IOWA.

ANIMAL-POKE.

SPECIFICATION forming part of Letters Patent No. 345,600, dated July 13, 1886.

Application filed March 10, 1886. Serial No. 194,733. (No model.)

*To all whom it may concern:*

Be it known that I, CHARLES E. PHIFER, a citizen of the United States, residing at Jesup, in the county of Buchanan and State of Iowa, have invented certain new and useful Improvements in Animal-Pokes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1 is a view of my improved poke applied to a horned animal. Fig. 2 is a view of the same applied to an animal without horns; and Figs. 3 and 4 are detail views of the poke.

This invention relates to animal-pokes, and has for its object to prevent animals from crawling through or jumping over fences; and it consists in the combination of parts, as will be more particularly described, and pointed out in the claims.

Referring to the accompanying drawings, A represents the bar of the poke, preferably made of wood, and of such length as to project a sufficient height above the animal's head.

B is a strap, which is connected to the lower end of the bar by means of the ring C and stirrup D. The upper portion of the bar is provided with pins E, which project forwardly, as shown. The middle portion of the bar passes through a ring or loop, F, which is secured to the animal's neck or head by means of a strap or halter. The poke is secured to the animal by buckling the strap B around the fetlock of one of its fore legs and passing the bar through the loop F and letting the upper portion project above the animal's head.

One of the greatest objections to the use of wire fencing among farmers is the ease with which animals, and especially smaller ones— as calves—can crawl under or between the strands. This difficulty has led to the use of barbed wire to a great extent; but still it does not remove it, and pokes must be resorted to. When an animal that is provided with one of my pokes tries to break through a fence, the pins at the upper portion catch upon the different strands of wire and hold them together, the same as would be done by a post, thus making the poke a portable post, which the animal carries with it and applies to the fence just where the strain will be applied to it. If desired, however, the pins can be dispensed with entirely and the bar left smooth or supplied with notches upon its front portion, which will perform the same duty as the pins. If the animal is inclined to be breachy, a hole is bored through the bar near its middle, and a pin, G, passed through it above the loop or ring F, so that the animal cannot raise its head high enough to jump over the fence. By placing the pin G nearer the lower end of the bar the poke will also serve as a hopple as well, and instead of a strap or halter the ring F can be secured to the end of a chain, which is secured to the animal's head by means of the rings H H, which pass over its horns.

By the use of my invention the greatest freedom of motion of the animal's head is secured, and especially in grazing or walking; but at the same time it instantly gets in its way as soon as it tries to break through a fence.

Having thus described my invention, I claim and desire to secure by Letters Patent of the United States—

1. The combination of a bar the lower end of which is provided with a strap, a ring or loop sliding freely thereon, and a strap secured to said ring, as shown and described.

2. The combination of a bar the lower end of which is provided with a strap and the upper portion with a series of pins, a ring or loop sliding freely upon said bar, and a strap secured to said ring, as shown and described.

3. The combination of a bar the lower end of which is provided with a strap and the middle portion with an aperture, a pin through said aperture, a ring sliding freely upon said bar below said pin, and a strap secured to said ring, as shown and described.

4. The combination of a bar, a stirrup secured to its lower end, a ring secured in said stirrup, a strap secured to said ring, a loop sliding freely upon said bar, and a strap secured to said loop, as shown and described.

In testimony whereof I affix my signature in presence of two witnesses.

CHARLES E. PHIFER.

Witnesses:
GEO. S. MURPHEY,
MARY J. FRANKLIN.